United States Patent
Lem et al.

(10) Patent No.: US 6,660,953 B2
(45) Date of Patent: *Dec. 9, 2003

(54) MULTI-FIRE AND VARIABLE FIRE DIVERTER CONVEYOR SYSTEM AND METHOD

(75) Inventors: Hans Lem, Franklin Lakes, NJ (US); William Pong, Concord, MA (US)

(73) Assignee: Quantum Conveyor Systems, LLC, Northvale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/073,779

(22) Filed: Feb. 11, 2002

(65) Prior Publication Data

US 2002/0079253 A1 Jun. 27, 2002

Related U.S. Application Data

(62) Division of application No. 09/347,765, filed on Jul. 6, 1999, now Pat. No. 6,359,247.

(51) Int. Cl.[7] .................................................. B07C 5/00
(52) U.S. Cl. ........................ 209/564; 209/586; 209/656; 198/349; 198/370.09
(58) Field of Search ................................. 209/559, 562, 209/563, 564, 586, 651, 654, 656, 657, 918, 919, 583; 198/349, 370.01, 370.09

(56) References Cited

U.S. PATENT DOCUMENTS

| | | | |
|---|---|---|---|
| 3,242,342 A | 3/1966 | Gabar | |
| 3,456,773 A | 7/1969 | Titmas, Jr. .................... | 198/20 |
| 3,512,624 A | 5/1970 | Crane .......................... | 198/19 |
| 3,515,254 A | 6/1970 | Gary .......................... | 198/21 |
| 3,680,692 A | 8/1972 | Southworth .................. | 209/74 |
| 3,955,678 A | 5/1976 | Moyer ......................... | 209/74 |
| 3,983,988 A | 10/1976 | Maxted et al. ............... | 198/365 |
| 4,214,663 A | 7/1980 | Schopp et al. ............... | 209/552 |
| 4,249,661 A | 2/1981 | Lem ............................ | 209/564 |
| 4,746,003 A | 5/1988 | Yu et al. ...................... | 198/367 |
| 4,944,505 A | 7/1990 | Sherman, III ................ | 271/265 |
| 5,029,693 A | 7/1991 | Williams ..................... | 198/372 |
| 5,199,548 A | 4/1993 | Tanaka et al. ............ | 198/205.4 |
| 5,246,117 A | 9/1993 | Zivley ......................... | 209/586 |
| 5,253,765 A | 10/1993 | Moorehead et al. ........ | 209/539 |
| 5,352,878 A | 10/1994 | Smith et al. ................ | 235/462 |
| 5,412,196 A | 5/1995 | Surka ......................... | 235/462 |
| 5,412,197 A | 5/1995 | Smith ......................... | 235/462 |
| 5,984,498 A | 11/1999 | Lem et al. .................. | 364/131 |
| 6,015,039 A | 1/2000 | Bonnet ....................... | 198/368 |
| 6,076,653 A * | 6/2000 | Bonnet .................. | 198/370.09 |
| 6,076,683 A * | 6/2000 | Okada et al. ............... | 209/656 |
| 6,085,892 A | 7/2000 | Lem et al. ............. | 198/370.09 |
| 6,359,247 B1 * | 3/2002 | Lem et al. .................. | 209/564 |

FOREIGN PATENT DOCUMENTS

| | | | | |
|---|---|---|---|---|
| GB | 2256179 | * | 12/1992 | ............ 198/370.09 |

* cited by examiner

Primary Examiner—Tuan N. Nguyen
(74) Attorney, Agent, or Firm—Downs Rachlin Martin PLLC

(57) ABSTRACT

A conveyor system (10) for transporting items in a first direction and diverting the items to the appropriate ones of a plurality of stations (50, 52) spaced from one another in the first direction. The system includes at least one diverter region (DR) and a diverter (16) arranged in each diverter region. Each diverter diverts items transported by the conveyor to the appropriate ones of the stations in response to corresponding fire signals. The conveyor system further includes a source of destination information (46) identifying the stations to which the items transported by the conveyor are to be diverted. The conveyor system also includes a controller system (40) connected to each diverter and the source for generating, and providing to each diverter, the fire signal for each item transported by the conveyor based on destination information from the source regarding to which one of the stations the item is to be diverted.

19 Claims, 7 Drawing Sheets

MULTI-FIRE AND VARIABLE FIRE DIVERTER CONVEYOR SYSTEM AND METHOD

PRIOR APPLICATION INFORMATION

This is a divisional application of U.S. Pat. application Ser. No. 09/347,765, filed Jul. 6, 1999, now U.S. Pat. No. 6,359,247.

FIELD OF THE INVENTION

The present invention relates to conveyor systems and conveying methods and, in particular, to such systems and methods having a multi-fire mode of operation involving multiple diversion points on a single diverter, and a variable fire mode of operation involving a variable diversion point on a single diverter.

BACKGROUND OF THE INVENTION

Conveyor sorting systems and methods for sorting items (e.g., packages) are common in the prior art. Conventional sorting is accomplished by providing a reader to read a preprinted code on an item to be sorted that has been placed onto the conveyor system, and thereafter activating an appropriate diverter in the proximity of the reader to cause the item to be diverted film the conveyor to an adjacent station. An exemplary prior art sorting system is described in U.S. Pat. No. 4,249,661 (the '661 patent). Other examples of high-speed sorting apparatus are disclosed in U.S. Pat. No. 6,085,892 (the '892 patent) and U.S. Pat. No. 5,984,498 (the '498 patent), which patents are hereby incorporated by reference.

It is often desirable to sort items traveling on a conveyor into different bins, stackers, conveyors or other devices, referred to generically herein as "stations," off to the side of the conveyer, depending on the nature of the item. Presently, this type of sorting is accomplished using a separate diverter for each station, such as illustrated in FIG. 3 of the '661 patent. However, the need for multiple diverters for such sorting increases the complexity and expense of the conveyer system.

It is also often desirable to sort items of various size based on their position relative to the diverter. For example, for relatively long items it is often desirable to divert the item from the conveyor when its center in the long dimension reaches a mid-point of the diverter. Similarly, for relatively short items it is often preferable to activate ("fire") the diverter when a different portion of the package (e.g., its leading edge) reaches the beginning of the diverter.

As described in U.S. Pat. Nos. 3,242,342, 3,515,254 and 3,512,624, it is known to divert packages from a conveyor when the center of the package reaches the mid-point of the diverter. It is also known to take various actions in a conveyor system as a function of the length of a package being conveyed. See U.S. Pat. No. 3,680,692. Unfortunately, it is believed no conveyor systems exist that determine the length of a package and then fire a diverter when a selected position on the package reaches a selected position on the diverter as a function of the length of the package. As such, known conveyor systems are not particularly well adapted to conveying packages of widely varying lengths, with the result that packages are often mis-diverted, turned in an undesirable orientation or not diverted at all.

SUMMARY OF THE INVENTION

The present invention relates to conveyor systems and methods, and in particular such systems and methods having a multi-fire operation involving multiple diversion points on a single diverter, and a combined multi-fire and variable fire operation involving a variable diversion point on one of multiple diversion points of a diverter. The invention also relates to a modular conveyor system.

A first aspect of the invention is a diverter system for diverting items to one of a plurality of stations on either side of a conveyor. The diverter system is designed for use with a conveyor for transporting items in a first direction. The conveyor includes at least one diverter region in which the diverter system is positionable. The diverter system comprises a diverter for diverting items transported by the conveyor in the first direction to one of a plurality of stations adjacent the diverter that are spaced from one another in the first direction, when positioned in a diverter region of the conveyor, in response to a fire signal. The diverter system also includes a source of destination information identifying one of the plurality of stations to which items transported by the conveyor are to be diverted, and a controller system connected to the diverter and the source for generating, and providing to the diverter, a fire signal for each item transported by the conveyor based on destination information from the source regarding the one of the plurality of stations to which the item is to be diverted.

A second aspect of the invention is a conveyor system including a conveyor having at least one diverter region. In addition, the conveyor system includes the diverter system described above, with a diverter being arranged in the diverter region of the conveyor.

A third aspect of the invention is a diverter system for diverting items having first and second item tracking points to one of a plurality of stations, each station having a central axis and a divert axis. The diverter system is designed for use with a conveyor for transporting items in a first direction, the conveyor having at least one diverter region in which the diverter system is positionable. The diverter system comprises a diverter for diverting items transported by the conveyor in the first direction to one of a plurality of stations adjacent the diverter that are spaced from one another in the first direction, when positioned in a diverter region of the conveyor, in response to a fire signal. The diverter system also includes a source of destination information identifying one of the plurality of stations to which items transported by the conveyor are to be diverted. It also includes an item measuring system for generating information representative of the length of items transported by the conveyor and for providing a length signal based on such information for each item indicating the length of the item. In addition, the diverter system includes a controller system connected to the diverter, the source and the item measuring system, for generating a fire signal for each item to be diverted and providing the fire signal to said diverter. The controller system contains information representing a first length, and the fire signal is generated for each item to be diverted based on destination information from the source regarding one of the plurality of stations to which the item is to be diverted and as a function of the length signal for such item so that the fire signal causes the diverter to divert items that are less than the first length substantially when the first item tracking point of the item arrives at the divert axis for the one of the plurality of stations and for diverting items that are greater than the first length substantially when the second item tracking point of the item arrives at the central axis for the one of the plurality of stations.

A fourth aspect of the invention is a conveyor system including a conveyor having at least one diverter region. In addition, the conveyor system includes the diverter system described in the immediately preceding paragraph, with a diverter being arranged in the diverter region of the conveyor.

A fifth aspect of the invention is a method of diverting items moving along a conveyor having a diverter to one of a plurality of stations adjacent the diverter. The method comprises, as a first step, providing destination information for each item transported by the conveyor identifying the one of the plurality of stations adjacent the diverter to which said each item is to be diverted. The method also includes the step of diverting said each item from the conveyor to said one of the plurality of stations based on said destination information for said each item.

A sixth aspect of the invention is a modular conveyor system comprising a plurality of modular conveyor sections. Each section includes (1) a conveyor for transporting items in a first direction, wherein the conveyor is connectable to conveyors in other ones of the modular conveyor sections so as to form a continuous conveyor assembly, (2) a diverter for diverting items transported by the conveyor in the first direction to one of a plurality of stations adjacent the diverter that are spaced from one another in the first direction in response to a fire signal, and (3) a controller system connected to the at least one diverter for providing a fire signal to the at least one diverter for each item to be diverted, wherein the controller system is connectable to the controller systems in other ones of the modular conveyor sections so as to permit fire signals to be communicated between the controller systems. The modular conveyor system also includes a source of destination information identifying a one of the plurality of stations in the modular conveyor system to which each item transported by the modular conveyor system is to be diverted. Also, the modular conveyor system has a host controller connected to the source and to the controller systems, wherein the host controller generates the fire signal for each item transported by the modular conveyor system based on the destination information from the source, and provides the fire signal to at least one of the controller systems.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE INVENTION

The present invention relates to conveyor systems and conveying methods and, in particular, to such systems and methods having a multi-fire mode of operation involving multiple diversion points on a single diverter, a variable fire mode of operation involving a variable diversion point on a single diverter and a combination of both.

Figure 1:
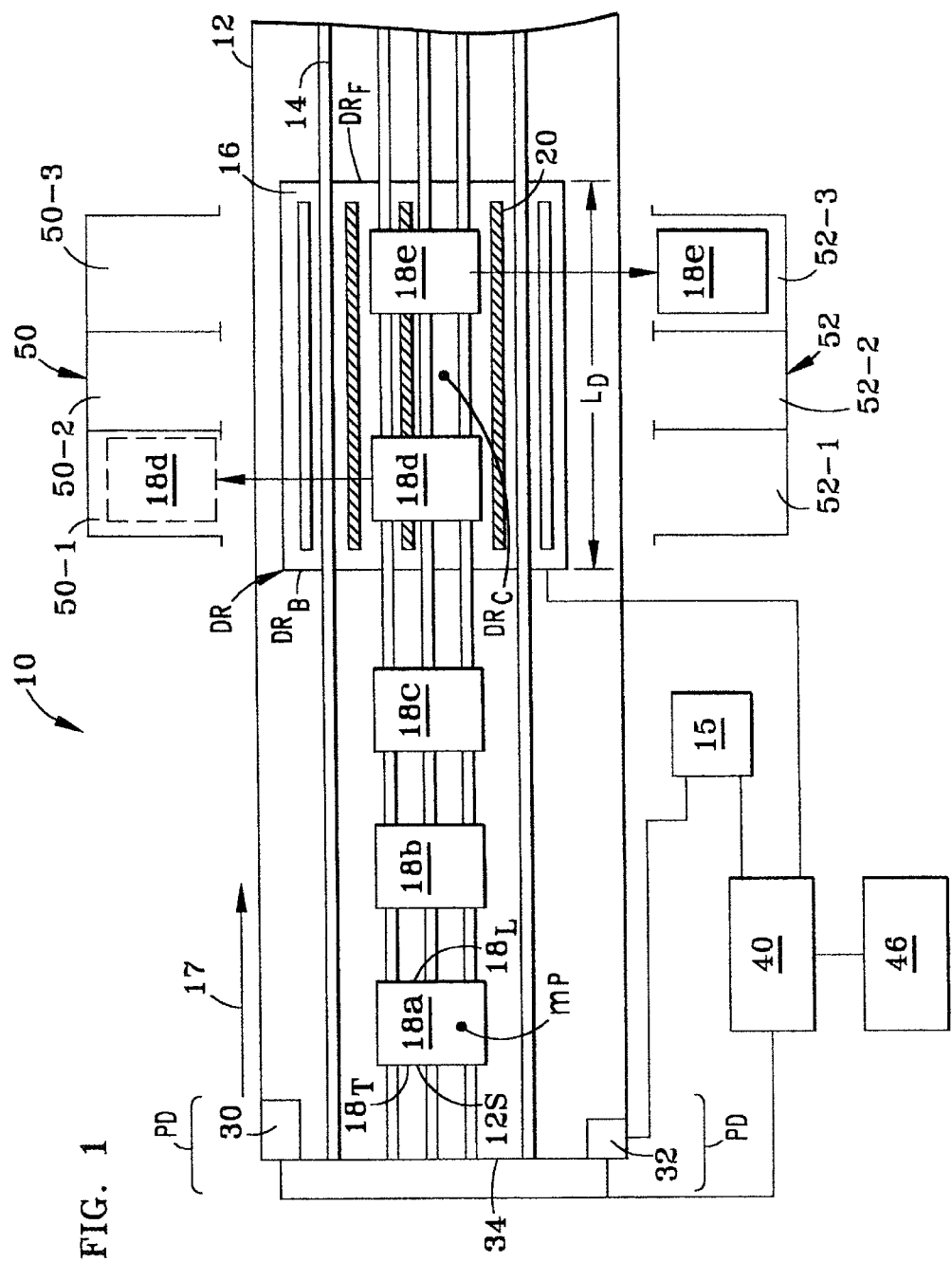
FIG. 1 is a schematic plan view of a conveyer system according to the present invention.

With reference to FIG. 1, a first aspect of the invention is a conveyer system 10 comprising a frame 12 which supports a plurality of parallel conveyor belts 14 that move from left to right over the frame at a speed determined by a conveyor belt drive controller 15 operatively connected to the conveyor belts. System 10 further includes one or more diverter regions DR with a front edge DRF, a back edge DRB and a center DRC, in which is located a diverter 16 for diverting items 18, such as items 18a–18e, from the direction of travel of conveyor belts 14, as indicated by arrow 17. Diverter 16 includes a plurality of rollers 20 located between and parallel to belts 14. Rollers 20 are preferably disposed below the level of belts 14 and are capable of being raised to the level of belts 14 or slightly above, so as to engage one or more of items 18a–18e when one or more of the items needs to be diverted from conveyor 10, as described in more detail below. A suitable diverter 16 is disclosed in U.S. Pat. No. 6,085,892.

System 10 also includes a photodetector system PD arranged upstream of diverter 16 at or near an input end 34 of conveyor system 10 at a predetermined distance film diverter region DR. Photodetector system PD comprises a photodetector 30 on one side of frame 12 and a "tick" generator 32, shown located on the opposite side of the frame. Photodetector 30 may be, for example, a diffuse photoeye. Tick generator 32 is in electrical communication with controller 15 and controller unit 40 (discussed below) and generates ticks corresponding to the speed of conveyor belts 14. Tick generator 32 may include, for example, a light source and a detector with a beam chopper disposed therebetween, with the beam chopper driven in proportion to the speed of conveyor belts 14. An exemplary tick generator 32 is made by Telemechanique (a division of Square D), model no. XUB-JO83135D. An exemplary photodetector 30 is a transmissive opto schmitt sensor made by Honeywell, model no. HOA0973-N55.

Tick generator 32 emits ticks, the timing of which is related to the speed of conveyor belts 14. Thus, each tick interval P corresponds to a distance of travel x of conveyor belts 14, e.g., one tick for each inch of travel, and hence the distance of travel of an item carried thereon. Thus, for n ticks, the distance of travel of an item down the conveyor is nx.

System 10 further includes a controller unit 40 in electrical communication with photodetector system PD, conveyer belt drive unit 15, diverter 16 and tick generator 32. A suitable controller unit 40 for the present invention may be the controller described in U.S. Pat. Nos. 6,085,892 and 5,984,498. Controller unit 40 controls the functions and operation of conveyor apparatus 10 of the present invention, including diverter 16, as described in more detail below.

System 10 also includes destination information source 46, which is in electrical communication with control unit 40. Destination information source 46 contains information regarding which diverter 16 in system 10 will be used to divert a given item 18 and, optionally, which station 50 and 52 (described below) adjacent the diverter will receive the item. Destination information source 46 may comprise a conventional bar code reader system for detecting and decoding information contained in a bar code (not shown) applied to an item 18. Suitable known bar code reader systems are described in U.S. Pat. Nos. 5,323,878, 5,412,196 and 5,412,197, which are incorporated herein by reference. Bar codes applied to items 18 may contain a unique identification code for the item, its final destination (e.g., shipping address of the party receiving the item), the diverter 16 to be used to divert the item and, optionally, the station 50 or 52 within a given diverter to which the item is to be diverted.

Alternatively, destination information source 46 may include computer memory (not shown) for storing a sequence table that assigns a destination based on the order of arrival of items at photodetector system PD. For example, if there is a conveyor system, such as multiple conveyor system 400 described below, where there are n diverters 16a, 16b ... 16n, the sequence table could be configured to send a first item to diverter 16a, a second item to diverter 16b, a third item to diverter 16c, a fourth item to diverter 16a, a fifth item to diverter 16b, etc. Alternatively, the sequence table could also be configured to send the first three items to diverter 16a, the next three to diverter 16c, the next three to diverter 16c, the next three to diverter 16a, etc. In any event, destination information source 46 preferably comprises a lookup table that contains the above-described destination information for each item 18 being conveyed, or that will be conveyed, by system 10.

Located adjacent conveyor system 10 on either side of diverter 16 are a plurality of stations 50 and 52, illustrated in FIG. 1 as including stations 50-1, 50-2, 50-3 and 52-1, 52-2, 52-3, respectively, arranged along the direction of travel on either side of the conveyor system, for receiving one or more items 18a–18e that are diverted from the conveyor system. Stations 50 and 52 may comprise, for example, a stacker, one or more bins, a conveyor or other known devices for receiving an item 18. While stations 50 and 52 have been illustrated in FIG. 1 to each have three stations, it is to be appreciated greater and lesser numbers of stations may be used.

Figure 2:
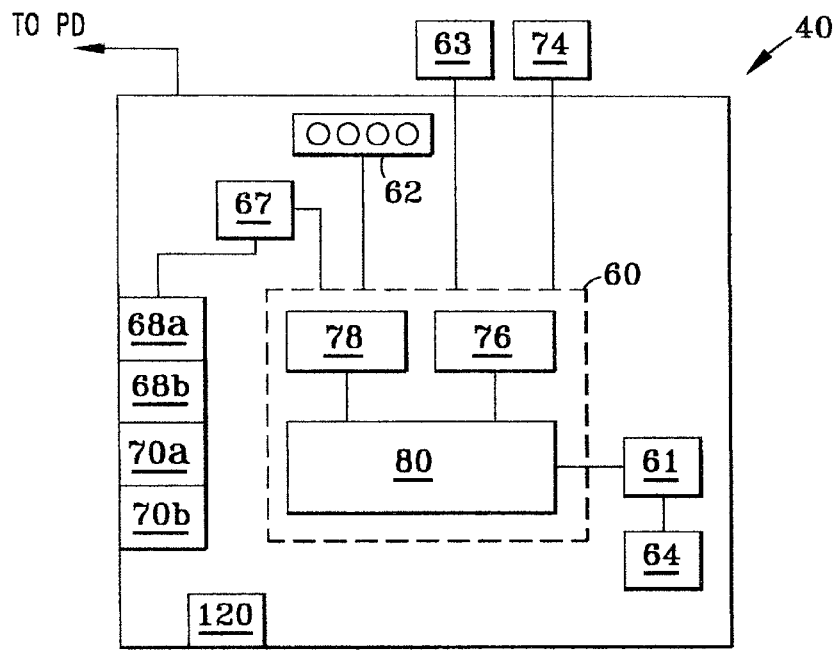
FIG. 2 is a schematic diagram of the controller unit for the conveyor system of FIG. 1.

With reference now to FIG. 2, controller unit 40 is now described in more detail. Controller unit 40 comprises a processor 60, a read-write memory 61, status lights 62, a signal generator 63, a battery 64, input/output (I/O) port 66 and an amplifier 67. Also included is at least one inflow bi-directional communications port 68 (68a, 68b) and corresponding outflow bi-directional communications port 70 (70a, 70b). The bi-directional communication ports 68 and 70 are preferably RS485 connectors with two RJ31X modular connections. Below is described in detail a conveyor system 400 made up of a plurality of conveyor systems 10. In this conveyor system 400, individual controller units 40 are interconnected to each other for bi-directional communication therebetween.

Controller unit 40 is powered in any of a number of ways. In one embodiment, electrical power is supplied to the controller via a cable interconnecting communication ports 68 and 70 of each controller unit. Thus, each controller unit 40 may be powered from a central source. The central power supply provides power in the range of from about 20 Vac to about 52 Vac and preferably is about 24 Vac or about 48 Vac. Alternatively, each controller unit 40 or a group of such controller units is connected to a power supply in the above voltage ranges.

Battery 64 is preferably a 3V Lithium coin cell or any long-life type battery known in the art. Battery 64 supplies backup power to read/write memory 61 in the event of a power failure, so that data is retained until power is restored. For a conveying or sorting system application, the information retained includes item tracking information and configuration parameters for conveyor system 10. Also included is information concerning items 18 traversing the section of conveyor system 10 under the control of the controller unit 40, and any sorting or routing instructions for these items. Alternatively, or in addition to battery 64, controller 40 may use non-volatile memory of the type that retains information when there is a power failure.

Additionally, one or more external input devices 74 can be disposed along conveyor system 10 to sense the item being diverted or sorted. In this way, processor 60 can determine if a proper diversion was made or whether conveyor system 10 performed an incorrect diverting operation.

Processor 60 can thus evaluate these and other inputs to determine if conveyor system 10 is in a failed or faulted condition, and can provide an output indicating this failed condition to prevent further operation or action by the failed/faulted conveyor system.

Processor 60 preferably includes a non-volatile random access memory (NVRAM) 76, an EEPROM 78, and a central processing unit (CPU) 80. The applications program or software routines for operating conveyor system 10 are preferably stored in EEPROM 78, which is easily removed in the field for replacement. The configuration parameters preferably are stored in NVRAM 76 so they are easily changed in the field, particularly by the user.

NVRAM 76 stores data and any parameters required for the operation and/or configuration of each controller unit 40. For example, the data regarding items in an area or section under the control of a given controller unit 40, and any related tracking and routing data for each of these items is stored in the NVRAM. Further, the configuration parameters required to enable the control routines for a given section type of a conveying system are also stored therein.

A suitable CPU 80 is a PIC17C43 by MicroChip Corp., and alternatively may be PIC17C44 by MicroChip Corp. The software routines stored in EEPROM 78 are loaded into CPU 80 and specific routines are enabled by means of the configuration parameters retrieved from NVRAM 76.

Figure 3:
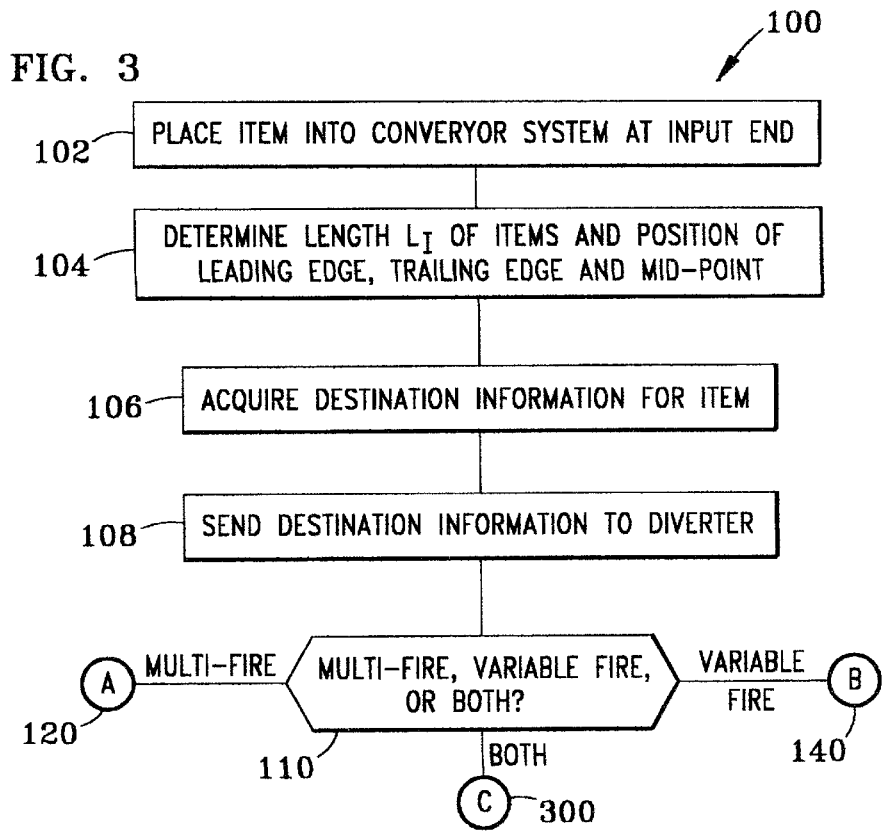
FIG. 3 is a flow diagram setting forth the initial steps for controlling the operation of the conveyor system of FIG. 1.

With reference to FIGS. 1–3, the operation of conveyor system 10 according to a first aspect of the present invention is now described. The operation steps described below are implemented via a software program preferably stored in EEPROM 78 which is executed by CPU 80 in combination with NVRAM 76. As those skilled in the art will appreciate, the operational steps described below may be implemented with one of a variety of programming languages. In the first step 102, one of items 18a–18e is placed onto the conveyor belts 14 at input end 34. Next, in step 104, photodetector system PD detects the presence of item 18 as it passes therethrough. Based on information provided by photodetector system PD, controller unit 40 determines the length $L_I$ of item 18 in the direction of travel of conveyor belts 14, represented by arrow 17, and the relative positions of the item's leading edge $18_L$, trailing edge $18_T$, and/or mid-point MP (see item 18a in FIG. 1).

Figure 4:
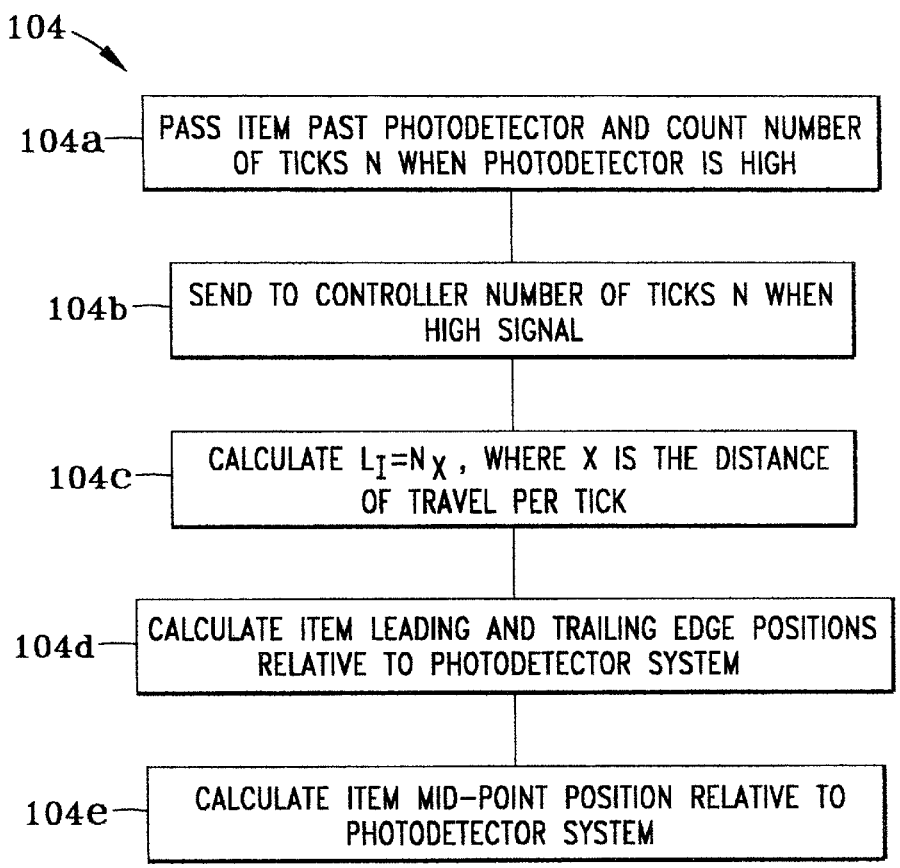
FIG. 4 is a flow diagram setting forth the steps for determining the length of an item conveyed by the conveyor system of FIG. 1, and the position of its leading edge, trailing edge and mid-point.

Referring now to also to FIG. 4, step 104 itself includes a number of steps 104a–104e pertaining to how the length $L_I$ of items 18 and the item's leading edge 18$_L$, trailing edge 18$^T$, and/or in mid-point MP are determined. The position of item 18 relative to a point on conveyor system 10 (e.g., input end 34) is continuously updated as the item travels down the conveyor system, as described below.

In step 104*a*, as item 18 passes photodetector PD a light signal is reflected from the item and received by the photodetector 30, causing the signal to go high for N ticks (alternatively, the signal could go low). Next, in step 104*b*, photodetector 30 transmits an electrical signal to controller unit 40 indicating the presence of item 18, i.e., a high signal, while tick generator 32 continuously transmits a pulse train of ticks to controller 40. Then, in step 104*c*, based on the signals transmitted in step 104*b*, controller unit 40 calculates the length $L_I$ of the item 18 along its direction of travel by multiplying the number of ticks, during the time the output of photodetector 30 indicates the presence of an item, by the distance of travel per tick x, i.e., $L_I$=Nx. For example, controller unit 40 may be programmed to interpret one tick as equivalent to one inch of travel, plus or minus ten percent. The actual conversion factor may vary because of mechanical tolerance build-up. In practice, the conversion factor may be measured via observation after the conveyor system is assembled.

Also, it will be apparent to one skilled in the art that either a time-based or distance-based calculation may be used in implementing the present invention. It may be preferable in some instances to use a distance-based calculation, because the conveyor belts 14 could stop for periods of time. In this case, tick generator 32 would stop generating ticks. On the other hand, the time-based calculation can be suspended when there is no movement of items 18 down conveyor system 10. Accordingly, the present invention is not limited to either a time-based or a distance-based calculation in its implementation.

Next, in step 104*d*, controller unit 40 also calculates the position of leading edge 18$^L$, trailing edge 18$_T$, and/or mid-point MP of item 18, as selected, passing through photodetector system PD relative to the photodetector system. This is accomplished by noting the arrival of the leading edge 18$_L$ and counting the number of ticks until trailing edge 18$_T$ or mid-point MP of the item passes through photodetector system PD. This number is N, as discussed above. The distance the leading edge 18$_L$ of item 18 has traveled down conveyor system 10 is equal to the length $L_I$=Nx when the moment the leading edge of the item passes photodetector system PD. The position of the leading edge and trailing edge of item 18 is continuously updated as the item travels down conveyor system 10 at a fixed rate of speed s. Thus, tick generator 32 (or signal generator 63) provides a signal at an interval t that is used in calculating the distance an item 18 travels. Controller unit 40 determines the distance X an item 18 has traveled at any instant by counting the number of ticks emitted from tick generator 32, so that X=s(nt). Controller unit 40 maintains an array of data records for each item 18 under its control. These records correlate an item 18 identification with the item's position. Further, controller unit 40 is programmed with the number of ticks between a reference point on conveyor system 10 and various points along the direction of travel of an item, such as back edge DR$_B$, front edge DR$_F$, or points therebetween.

Finally, in step 104*e*, the position $X_{MP}$ of the mid-point of item 18 is calculated and tracked as the item travels down the conveyor. Position $X_{MP}$ of the mid-point is simply half-way between the leading and trailing edge locations of item 18, as ascertained above. If the leading and trailing edge positions as a function often relative to a reference point on conveyor system 10 are $X_{LE}$(t) and $X_{TE}$(t), respectively, then the location of the item's mid-point as a function of time is $X_{TE}$(t)+$L_I$/2 or $X_{LE}$(t)−$L_I$/2. If the variable fire functionality of conveyor system 10, described below, is not used, step 104*e* may be omitted.

With reference again to FIG. 3, at step 106, destination information is acquired by control unit 40 for an item 18 from destination information source 46. As noted above, this information includes the diverter 16 to be used to divert the item and, optionally, the station 50 or 52 to which the item is to be diverted.

Multi-fire Mode

With continuing reference to FIG. 3 and flow diagram 100, at query step 110, a determination is made whether system 10 is to be operated in a multi-fire mode, a variable fire mode or both. The multi-fire mode is used when it is desired to divert items 18 to different stations within stations 50 or 52 in a given diverter 16, such as stations 50-1 to 50-3 and/or stations 52-1 to 52-3. The multi-fire mode of operation provides greatest benefit when length $L_I$ of items 18 is significantly less that the length $L_D$ of diverter 16.

Figure 5:
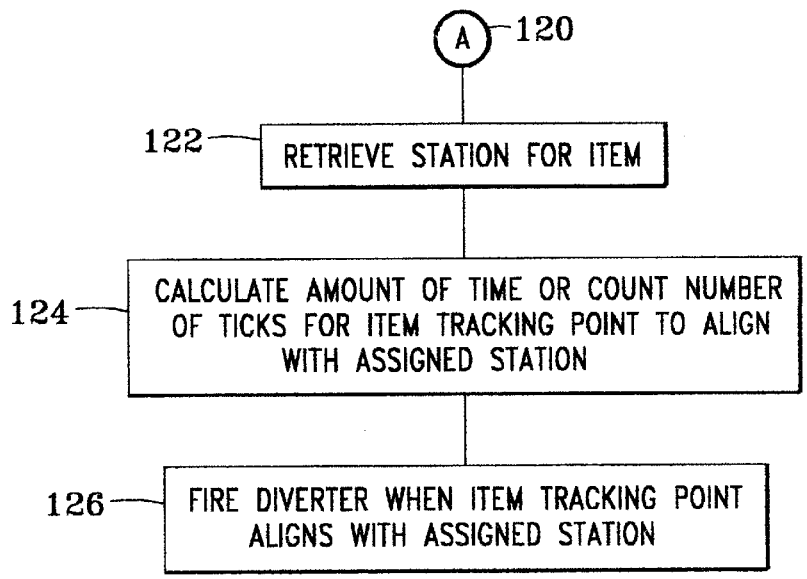
FIG. 5 is a flow diagram setting forth the steps for implementing the multi-fire mode of operation with the conveyor system illustrated in FIG. 1.

The multi-fire mode of operation is described with reference again to FIG. 1 and also to flow diagram 120 of FIG. 5, which is a continuation of flow diagram 100 of FIG. 3. In step 122, a station and station destination is retrieved for the item (e.g., item 18*d* to station 50-1) based on information contained in destination information source 46. This information is provided to controller unit 40. Controller unit 40 also includes information pertaining to the distance from input end 34 of conveyor system 10 (or any other fixed location on the conveyor system) to positions along the length of each diverter 16 (in the direction of arrow 17) where a corresponding respective station 50 or 52 is located. This information may be in the form of the number of ticks, which represent a given distance as discussed above.

Next, at step 124, controller unit 40 calculates the amount of time or distance (number of ticks) it takes either the leading edge 18$_L$, mid-point MP, trailing edge 18$_T$ or other point (such points are hereinafter referred to generally as item tracking point 125, e.g., trailing edge 18$_T$ of item 18*a*) after passing through photodetector system PD to reach alignment with the selected station 50 or 52 to which the item 18 is to be diverted. This calculation may be made by controller unit 40 in absolute time units or in terms of distance based on the number of ticks emitted by tick generator 32 during the period when item tracking point 125 of item 18 travels from a given reference point, e.g., leading edge 34, on conveyor system 10 to the position in diverter 16 adjacent a selected station 50 or 52. Controller unit 40 then generates a diverter fire signal based on this calculation which is provided to diverter 16. This diverter fire signal contains information that directs diverter 16 when to fire.

In practice, calculation of a diverter fire signal may simply consist of controller unit 40 referencing predetermined distances or ticks between stations 50 and 52 stored in destination information source 46 or EEPROM 78. For example, a diverter 16 may be spaced the distance represented by 300 ticks provided by tick generator 32 from leading edge 34 of conveyor system 10. Each station 50 or 52 may be spaced from adjacent stations by the distance represented by 12 ticks. Controller unit 40 counts down such tick amount beginning when an item tracking point passes a reference point on conveyor system 10, e.g., photodetector 30 or a station 50 or 52. When such tick count is completed this defines when the item tracking point has arrived at a location where it is intended diverter 16 should fire. At such location, controller unit 40 queries destination information Source 46 to assess if controller unit 40 should provide a diverter fire signal to diverter 16. If so, a fire signal is provided. If not, a new tick count is retrieved and a new tick countdown commences.

In step 126, pursuant to information in the diverter fire signal provided by controller unit 40, the diverter fires. This diverts the item 18 into its assigned station 50 or 52. This firing step involves diverter 16 operating, e.g., by initiating rotation of rollers 20 in the appropriate direction, and raising the rollers above the level of belts 14, so as to divert the item 18. For example, in FIG. 1, item 18d is shown being diverted into its assigned station 50-1 on one side of the conveyor, and item 18e is shown being diverted into its assigned station 52-3 on the other side of the conveyor at a location downstream from station 50-1.

Variable Fire Mode

Figure 6:
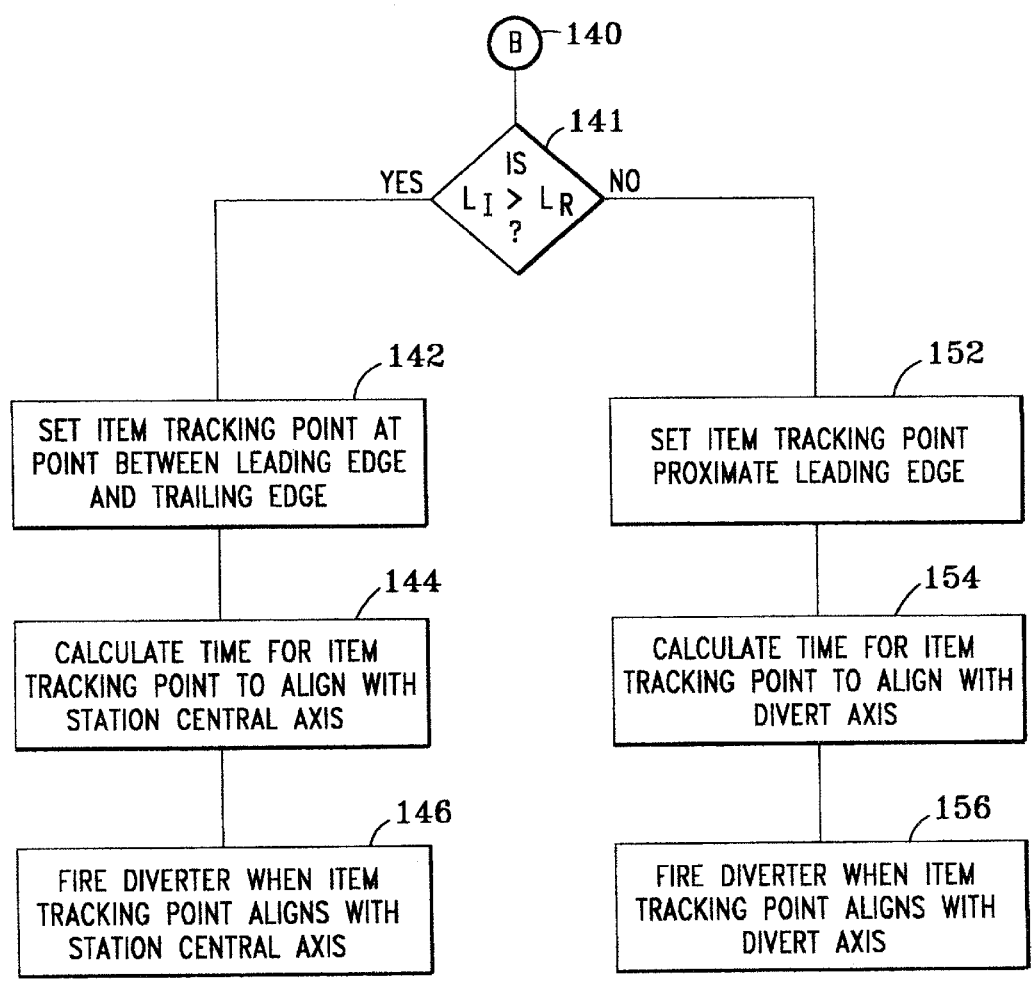
FIG. 6 is a flow diagram setting forth the steps for implementing the variable fire mode of operation with the conveyor system illustrated in FIG. 1.
Figure 7:
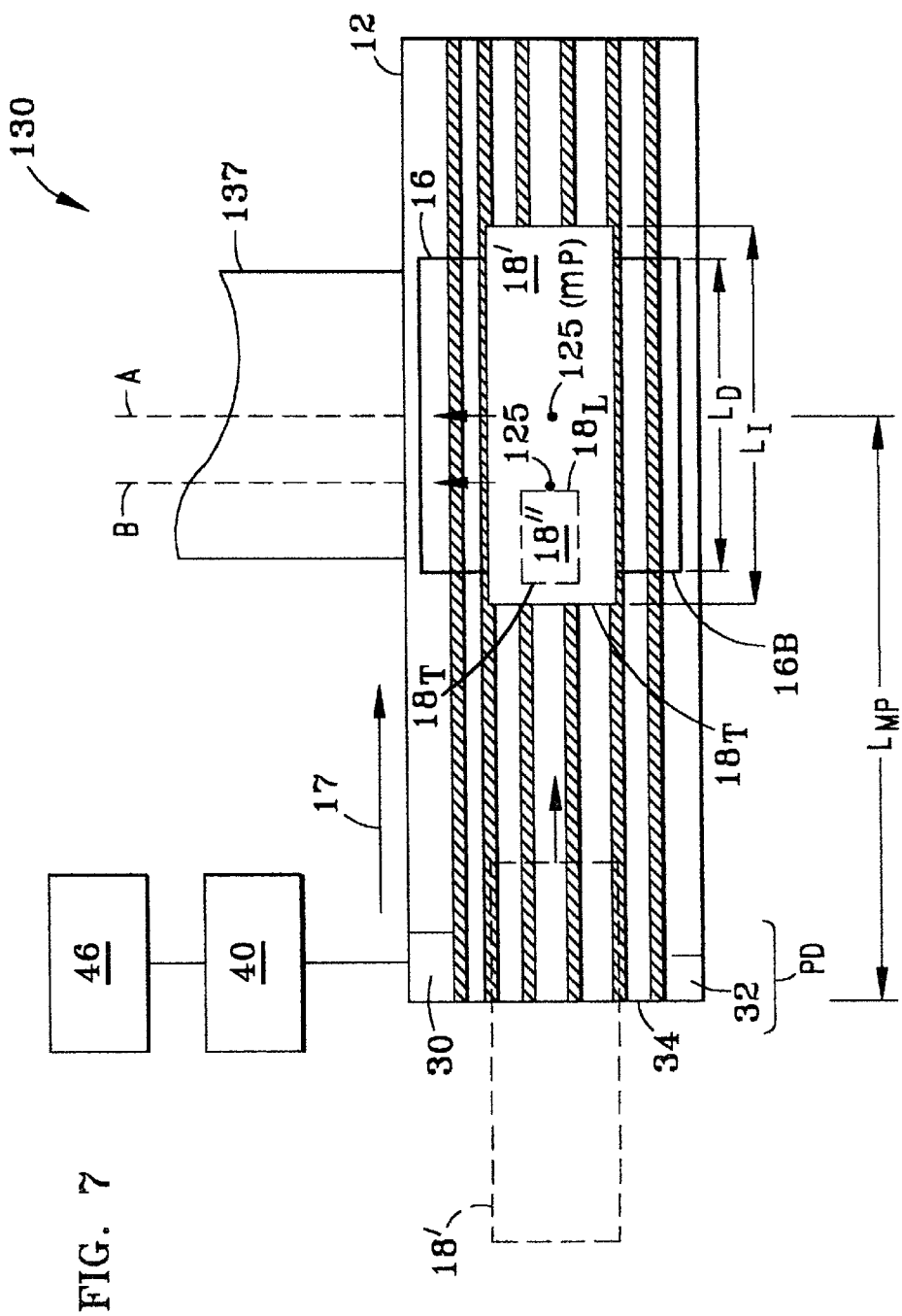
FIG. 7 is a schematic diagram of the conveyor system illustrating the diversion of an item in accordance with the variable fire mode of operation.
Figure 8:
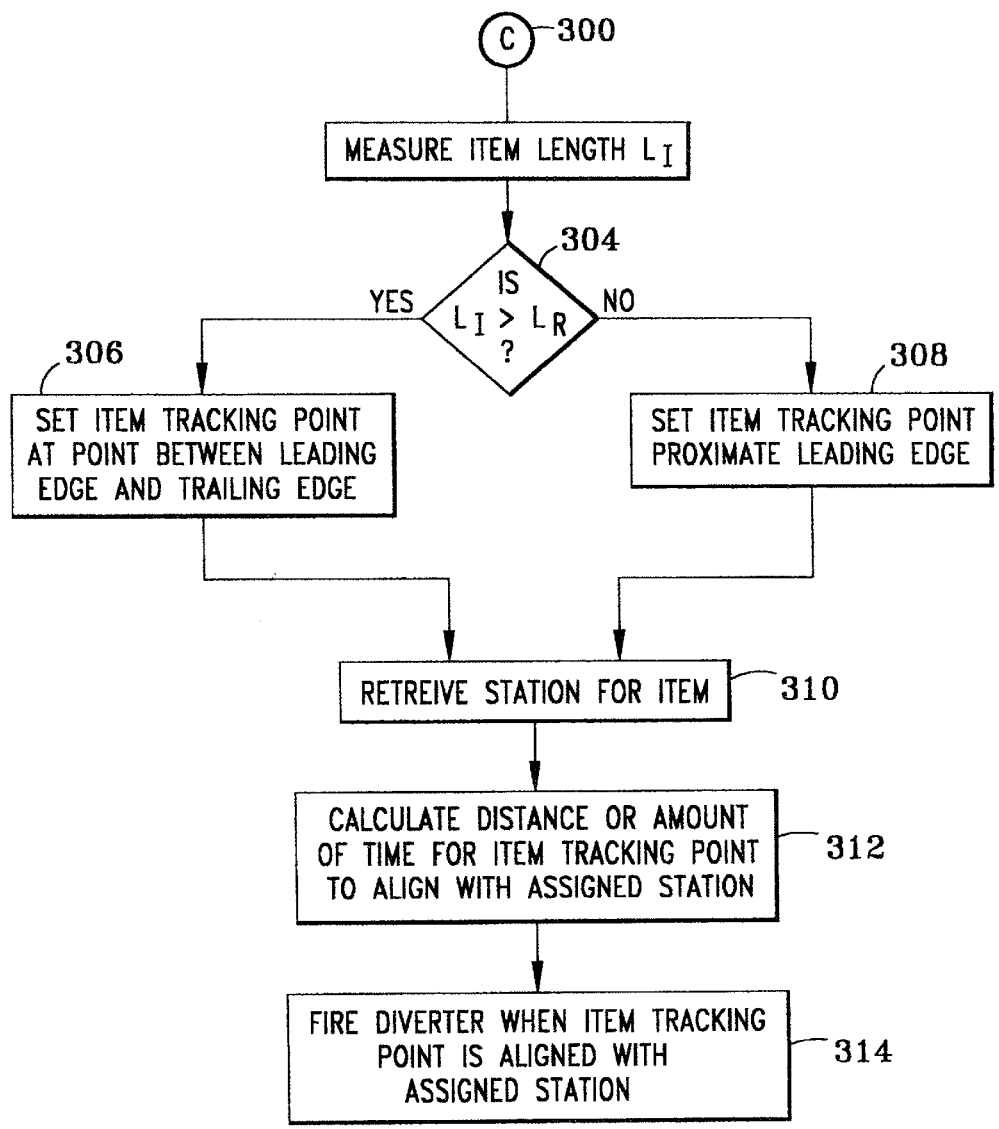
FIG. 8 is a flow diagram setting forth the steps for performing the enhanced diverting method according to the present invention, which involves both variable fire and multi-fire modes.

With reference again to FIG. 3 and flow diagram 100, if at query step 110 the variable fire mode is selected, then the operation of conveyor system 10 is controlled in accordance with flow diagram 140 illustrated in FIG. 6. The variable fire mode of operation involves diverting an item 18 from conveyor system 10 when item tracking point 125 reaches a selected position along the length of diverter 16 as a function of the item length $L_I$.

Accordingly, with reference to FIGS. 1, 3, 6 and 7, to facilitate description of the variable fire mode of operation there is shown a conveyor system 130 which is identical to conveyor system 10 of FIG. 1, described above, except that stations 50 and 52 have been replaced with a station 137 having a central axis A, the station being arranged adjacent frame 12 next to diverter region DR.

Assuming the query at step 110 results in selection of the variable fire option, operation of conveyor system 10 proceeds in accordance with the steps of flow diagram 140. At step 141, a determination is made whether length $L_I$ of item 18 is greater than a predetermined reference length $L_R$. The latter may be equal to the length $L_D$ of diverter region $D_R$, or may be of greater or lesser length, as those of ordinary skill in the art may readily determine by routine testing. If item 18, e.g., item 18' in FIG. 7, has a length $L_I$ greater than $L_R$, then in step 142 controller unit 40 sets a selected item tracking point 125 as the point of item 18' to be aligned with central axis A when the diverter 18 is fired. In the immediately following discussion item tracking point 125 is assumed to be mid-point MP, for the sake of simplicity.

Next, in step 144, based on the speed of travel of item 18, controller unit 40 calculates the distance to be traveled (in ticks), or time it takes, for mid-point MP of item 18, determined at step 104, to align with central axis A of station 137. Central axis A is at or near the mid-point of diverter 16, as measured in the direction of arrow 17. Based on this determination, controller unit 40 generates a diverter fire signal provided to diverter 16 in response to this timing information. More specifically, the timing of the diverter fire signal may be calculated by determining the number of ticks generated by tick generator 32 it takes for item mid-point MP to travel to central axis A. In step 146, when such alignment occurs, diverter 16 fires, thereby diverting item 18 to station 137. This allows a large package to be diverted to a station 137 without being twisted or spun.

While it is often preferred to fire diverter 16 when an item 18 having a length $L_I$ that is $>L_R$ is positioned so that its mid-point MP is aligned with central axis A, the present invention is not so limited. At step 142, the item tracking point 125 may be set at any point between leading edge $18_L$ and trailing edge $18_T$ of item 18'. This is accomplished by controller unit 40 performing a calculation, in accordance with user input, that sets the item tracking point 125 at any selected location between leading edge $18_L$ and trailing edge $81_T$. For example, to establish an item tracking point 125 that is directly in between leading edge $18_L$ and mid-point MP, controller unit 40 takes the average of the position of leading edge $18_L$ and mid-point MP.

In the next step 144, controller unit 40 calculates the distance to be traveled (in ticks) or time for the selected item tracking point 125 to align with the station central axis A. In step 146, when such alignment occurs, diverter 16 fires in response to a fire signal generated by controller unit 40, thereby diverting item 18' to station 137.

With continuing reference to FIG. 6, if at step 141 it is determined that item 18 has a length $L_I$ that is not $>L_R$, then operation of conveyor system 130 proceeds to step 152. There, item tracking point 125 is set, preferably at or near leading edge $18_L$. Next, at step 154, controller unit 40 calculates the distance to be traveled (in ticks) or the time required for the item tracking point 125 to align with divert axis B, as described above in connection with the description of such time calculation with respect to central axis A. Typically, but not necessarily, divert axis B is not coincident with central axis A, and is usually positioned closer to back edge $DR_B$ of diverter 16 than central axis A. The exact position of divert axis B will vary as a function of the speed of conveyor system 130, the weight and size of item 18" and other factors, and may be readily determined by those of ordinary skill in the art through routine experimentation. Finally, at step 156, diverter 16 is fired in accordance with a fire signal received from controller unit 40, which such un it generates based on the distance or time calculation described above.

The concept of variable diversion is of particular importance for high-speed conveyors. For example, when a relatively small item 18, such as item 18', travels on a high-speed conveyor, it acquires a momentum P=mv, where m is the mass of the package and v is its velocity. Because of this momentum, item 18 may follow a curved path when it is diverted from the conveyor system 10 or 130. Accordingly, it is necessary to fire diverter 16 so that the curved path along which item 18 travels when diverted results in the items being appropriately positioned on station 137.

Enhanced Diverting Method

The multi-fire and variable modes of operation were described above as separate operations to facilitate description of the invention. However, these two methods are combinable in a single enhanced diverting method. With reference again to FIGS. 1–3 and 8, if at step 110 (FIG. 3) a determination is made to select both multi-fire and variable fire modes of operation, then the operation of controller system 10 proceeds in accordance with the steps of flow diagram 300. The steps of flow diagram 300 comprise a combination of various steps of the flow diagrams earlier described.

First, in step 302, the item length $L_I$ is determined, as described above in connection with step 104. Next, in query step 304, the item length $L_I$ is compared to reference length $L_R$, as described above in connection with step 141. For example, the latter may be set to be substantially equal to length $L_D$) of diverter 16, to $L_D/2$ or to another value. If the item length $L_I$ is longer than reference length $L_R$, then the method proceeds to step 306, where item tracking point 125 is set at a selected point on item 18 between its leading edge $18_L$ and trailing edge $18_T$, often adjacent mid-point MP, as described above in connection with step 142. If at step 304 item length $L_1$ is not $>L_R$, then the process continues to step 308. There, item tracking point 125 is set, typically proximate leading edge 18$_L$, as described above in connection with step 152. After both steps 306 and 308, the process proceeds to step 310 where one of stations 50 and 52 and associated stations on diverter 16 is retrieved, as described above in connection with step 122. Then, at step 312, the distance to be traveled or amount of time required for the selected item tracking point 125 to become aligned with the assigned station 50 or 52 is calculated, as described above in connection with step 124. Finally, at step 312, diverter 16 fires when the selected item tracking point 125 is aligned, pursuant to a diverter fire signal provided by controller unit 40.

Multiple Conveyor System

Figure 9:
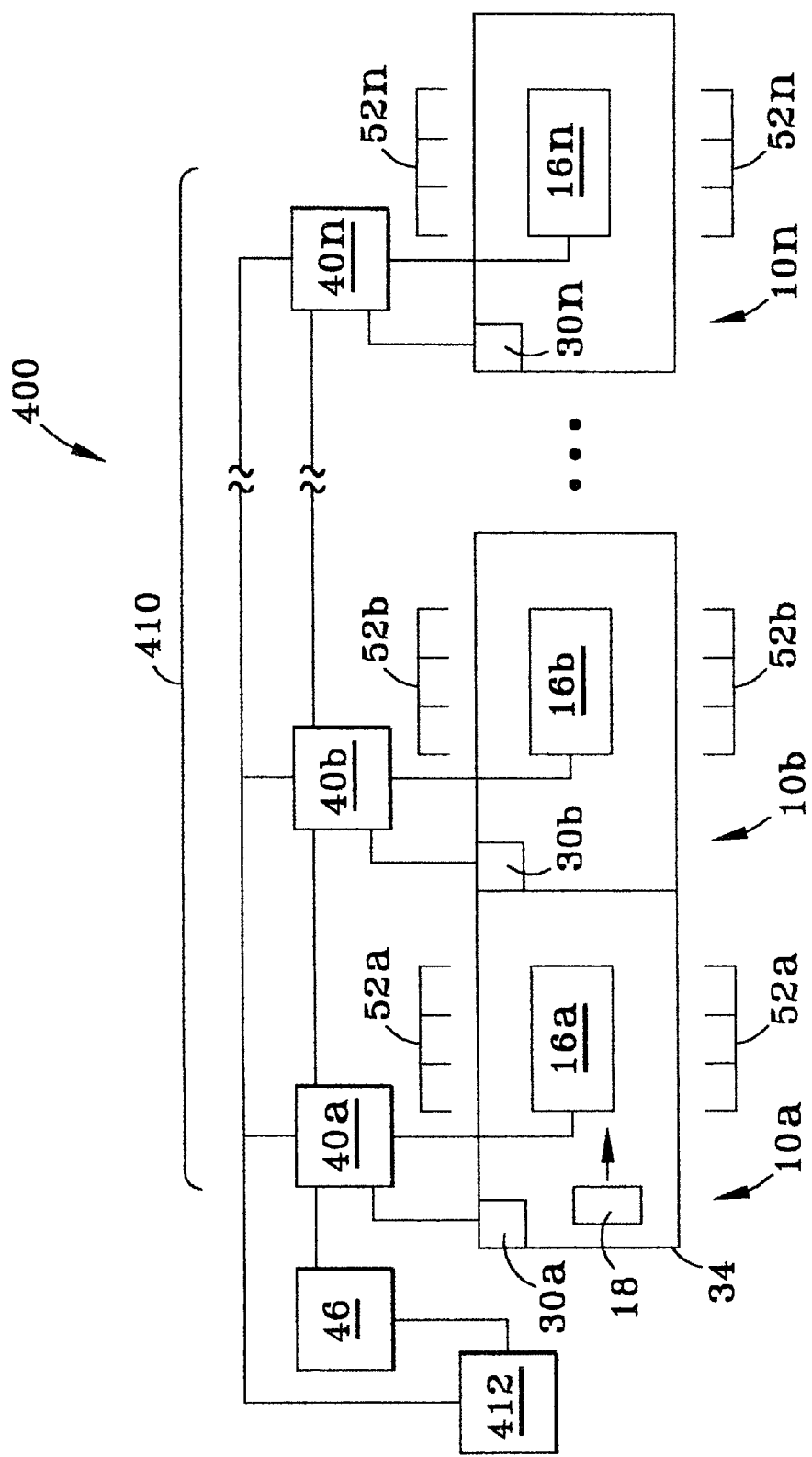
FIG. 9 is a schematic diagram of a conveyor system of the present invention comprising multiple conveyor sections.

With reference now to FIG. 9, a conveyer system 400 according to a second aspect of the invention is now described. Conveyor system 400 includes n conveyer sections 10a, 10b, . . . 10n arranged in series, with each equivalent to a single conveyor system 10, described above. Each section 10a, 10b, . . . 10n also includes a photodetector system PDa, PDb, . . . PDn, respectively, and a diverter 16a, 16b, . . . 16n, respectively, and controller units 40a, 40b, . . . 40n, respectively. In conveyor sections 10a–10n, destination information source 46 is not required, but is included in conveyor system 400, as discussed below. In addition, controller units 40a, 40b, . . . 40n are connected to form what is effectively a single controller unit 410 for system 400. Controller units 40a, 40b, . . . 40n are in electrical communication with a host controller 412. Associated with sections 10a, 10b, . . . 10n are stations 50a, 50b, . . . 50n, and stations 52a, 52b, . . . 52m, respectively. Thus, conveyor system 400 is a modular conveyor system.

During set-up of conveyor system 400, the relative distances between diverters 16a, 16b, . . . 16n is programmed into each controller unit 40a, 40b, . . . 40n. This information is generated by determining the distance from the beginning of a conveyor section, e.g., 10a, to the location of a diverter 16a, 16b, . . . 16n, and the distance between conveyor sections. The distance between diverter 16a, 16b, . . . 16n is used to time the firing of the diverters. This distance may be represented in the form, the number of ticks, or timing signals generated by signal generator 63 in host controller 412. In any event, a signal representative of distance between diverters is sent to all controller units 40a, 40b, . . . 40n so that a universal reference is established.

For a more detailed description of conveyor system 400, attention is directed to U.S. Pat. Nos. 6,085,892 and 5,984, 498, which contain a description of suitable modular conveyor controller systems.

In operation, an item 18 enters conveyor section 10a at input and 34. As described above, as item 404 passes photodetector system PDa, it is assigned a station to which it is to be diverted from information obtained by host controller 412 from destination information source 46 in electrical communication therewith. This diversion might involve the multi-fire mode of operation, the variable fire mode of operation, or both. This information is passed from host controller 412 to first control unit 40a. If item 18 is to be diverted to, for example, to station 52n, then item 18 needs to be conveyed from section 10a to section 10n without being diverted. To accomplish this, controller unit 40a passes the diverting information pertaining to item 18 to controller unit 40b, which in turn passes this information to the next controller unit, until the information reaches controller unit 40n. In other words, the responsibility for diverting item 18 is transferred in daisy chain fashion until it reaches the controller unit 40n for the section 10n in which the item 18 is to be diverted.

Controller units 40a–40n are preferably interconnected to each other for communication by appropriately interconnecting the inflow and outflow bi-directional communications ports 68 and 70 of adjacent controller units. Controllers 40a–40n are preferably connected to each other using a "daisy chain" topology, e.g., by interconnecting to an outflow bi-directional communications port 70a of controller unit 40a and into an inflow bi-directional communications port 68b of second controller unit 40b. Thus, a bi-directional communications link is established between all controller units 40a to 40n for the communication of data and information therebetween. Such interconnection and bi-directional communication is also described in more detail in connection with the controller system described in U.S. Pat. Nos. 6,085,892 and 5,984,498.

While the present invention has been described in connection with preferred embodiments, it will be understood that it is not so limited to those embodiments. On the contrary, it is intended to cover all alternatives, modifications, and equivalents as may be included within the scope of the invention as defined in the appended claims

What is claimed is:

1. A method of diverting items moving in a direction along a conveyor having a divercer to any one of a plurality of stations adjacent the diverter and spaced from one another along the direction of the conveyor, comprising the steps of:

providing destination information for each item transported by the conveyor identifying the one of the plurality of stations adjacent the diverter to which said each item is to be diverted; and diverting said each item with the diverter from the conveyor to any one of said one of the plurality of stations based on sild destination information for said each item.

2. A method according to claim 1, wherein said each item to be diverted has an item tracking point, further wherein said diverting step involves diverting said each item when said item tracking point is positioned in a first relationship to said one of said plurality of stations.

3. A method according to claim 1, further wherein said diverting step involves diverting said each item based on the length of said item.

4. A diverter system for diverting items to one of a plurality of stations, the diverter system designed for use with a conveyor for transporting items in a first direction, the conveyor having at least one diverter region in which the diverter system is positionable, the diverter system comprising:

a diverter for diverting systems items transported by the conveyor in the first direction to any one of a plurality of stations adjacent said diverter that are spaced from one another in the first direction, when positioned in a diverter region of the conveyor, in response to a fire signal;

a source of destination information identifying one of the plurality of stations to which items transported by the convey or are to be diverted; and a controller system connected to said diverter and said source for generating, and providing to said diverter, a fire signal for each item to be diverted based on destination information from said source regarding one of the plurality of stations to which said item is to be diverted.

5. A diverter system according to claim 4, wherein said controller system tracks the location of items transported on the conveyor and generates said fire signal based on both said destination information and the location of an item to be diverted on the conveyor.

6. A diverter system according to claim 5, each item having an item tracking point, wherein said controller system includes a detector for detecting when items pass a first location on the conveyor and said controller system generates said fire signal when the item tracking point of an item to be diverted is a first distance from said detector.

7. A diverter system according to claim 6, wherein said first distance is selected so that the item to be diverted is proximate the one of the plurality stations to which the item is to be diverted.

8. A diverter system according to claim 5, wherein said controller provides said fire signal to said diverter when the item to be diverted is proximate the one of the plurality stations to which the item is to be diverted.

9. A conveyor system for transporting items in a first direction and diverting the items to one of a plurality of stations, the system comprising:
   a conveyor having at least one diverter region;
   a plurality of stations adjacent said at least one diverter region that are spaced from one another in the first direction;
   at least one diverter, arranged in said at least one diverter region, for diverting each item transported by said conveyor in the first direction to any one of said plurality of stations in response to a fire signal;
   a source of destination information identifying one of said plurality of stations to which each item transported by the conveyor is to be diverted; and
   a controller system connected to said at least one diverter and source for generating, and providing to said at least one diverter, a fire signal for each item to be diverted based on destination information from said source.

10. A conveyor system according to claim 9, wherein said controller system tracks the location of items transported on the conveyor and generates said fire signal based on both said destination information and the location of an item to be diverted on the conveyor.

11. A conveyor system according to claim 10, each item having an item tracking point, wherein said controller system includes a detector for detecting when items pass a first location on the conveyor and said controller system generates said fire signal when the item tracking point of an item to be diverted is a first distance from said detector.

12. A conveyor system according to claim 11, wherein said first distance is selected so that the item to be diverted is proximate the one of the plurality stations to which the item is to be diverted.

13. A diverter system according to claim 10, wherein said controller provides said fire signal to said diverter where the item to be diverted is proximate the one of the plurality stations to which the item is to be diverted.

14. A diverter system for diverting items having first and second item tracking points to one of a plurality of stations, each station having a central axis and a divert axis, the diverter system designed for use with a conveyor for transporting items in a first direction, the conveyor having at least one diverter region in which the diverter system is positionable, the diverter system comprising:
   a diverter for diverting items transported by the conveyor in the first direction to any one of a plurality of stations adjacent said diverter that are spaced from one another in the first direction, when positioned in a diverter region of the conveyor, in response to a fire signal;
   a source of destination information identifying one of the plurality of stations to which items transported by the conveyor are to be diverted;
   an item measuring system for generating information representative of the length of items transported by the conveyor and for providing a length signal based on said information for each item indicating the length of the item; and
   a controller system connected to said diverter, said source and said item measuring system, for generating a fire signal for each item to be diverted and providing said fire signal to said diverter, wherein said controller system contains information representing a first length, further wherein said fire signal is generated for each item to be diverted based on destination information from said source regarding one of the plurality of stations to which said item is to be diverted and as a function of said length signal for said item so that said fire signal causes said diverter to divert items that are less than said first length substantially when the first item tracking point of the item arrives at said divert axis for said one of said plurality of stations and for diverting items that are greatar than said first length substantially when the second item tracking point of the item arrives at said central axis for said one of said plurality of stations.

15. A diverter system according to claim 14, wherein said controller system tracks the location of items transported on the conveyor and generates said fire signal based on both said destination information and the location of an item to be diverted on the conveyor.

16. A conveyor system for transporting items in a first direction, the items having a first item tracking point and a second item tracking point, the system comprising:
   a conveyor having at least one diverter region;
   a plurality of stations adjacent said at least one diverter region that are spaced from one another in the first direction;
   a diverter for diverting items transported by the conveyor in the first direction to any one of said plurality of stations adjacent said diverter in response to a fire signal;
   a source of destination information identifying one of the plurality of stations to which items transported by the conveyor are to be diverted;
   an item measuring system for generating information representative of the length of items transported by the conveyor and for providing a length signal based on said information for each item indicating the length of the item; and
   a controller system connected to said diverter, said source and said item measuring system, for generating a fire signal for each item to be diverted and providing said fire signal to said diverter, wherein said controller system contains information representing a first length, further wherein said fire signal is generated for each item to be diverted based on destination information from said source regarding one of the plurality of stations to which said item is to be diverted and as a function of said length signal for said item so that said fire signal causes said diverter to divert items that are less than said first length substantially when the first item tracking point of the item arrive at said divert axis for said one of said plurality of stations and for diverting items that are greater than said first length substantially when the second item tracking point of the item arrives at said central axis for said one of said plurality of stations.

17. A conveyor system according to claim 16, wherein said controller system tracks the location of items transported on said conveyor and generates said fire signal based on both said destination information and the location of an item to be diverted on the conveyor.

18. A modular conveyor system, comprising:
   a plurality of modular conveyor sections, each section including:
      a conveyor for transporting items in a first direction, wherein said conveyor is connectable to conveyors in other ones of said modular conveyor sections so as to form a continuous conveyor assembly;
      a diverter for diverting items transported by said conveyor in the first direction to any one of a plurality of stations adjacent said diverter that are spaced from one another in said first direction in response to a fire signal; and
      a controller system connected to said at least one diverter for providing a fire signal to said at least one diverter for each item to be diverted, wherein said controller system is connectable to said controller systems in other ones of said modular conveyor sections so as to permit fire signals to be communicated between said controller systems;
   a source of destination information identifying a one of said plurality of stations in the modular conveyor system to which each item transported by the modular conveyor system is to be diverted; and
   a host controller connected to said source and to said controller systems, wherein said host controller generates said fire signal for each item transported by the modular conveyor system based on said destination a information from said source, and provides said fire signal to at least one of said controller systems.

19. A modular conveyor system according to claim 18, wherein:
   each of said plurality of stations has a central axis and a divert axis;
   the modular conveyor system further includes an item measuring system fix generating information representative of the length of items transported by said conveyors in the modular conveyor system and for providing a length signal based on said information for each item indicating the length of the item to said host controller; and
   wherein said host controller contains information representing a first length, further wherein said host controller generates said fire signal for each item to be diverted based on said destination information from said source regarding one of the plurality of stations to which said item is to be diverted and as a function of said length signal for said item so that said fire signal causes a respective one of said diverters to divert items that are less than said first length substantially when a first item tracking point of the item arrives at said divert axis for said one of said plurality of stations and for diverting items that are greater than said first length substantially when a second item tracking point of the item arrives at said central axis for said one of said plurality of stations.

* * * * *